United States Patent
Swartzlander et al.

(10) Patent No.: US 7,527,761 B2
(45) Date of Patent: May 5, 2009

(54) PREPARATION OF YTTRIA-STABILIZED ZIRCONIA REACTION SINTERED PRODUCTS

(75) Inventors: Ruthie Swartzlander, Lakewood, CO (US); W. Grover Coors, Golden, CO (US)

(73) Assignee: CoorsTek, INc., Golden, CO (US)

( * ) Notice: Subject to any disclaimer, the term of this patent is extended or adjusted under 35 U.S.C. 154(b) by 146 days.

(21) Appl. No.: 11/014,198

(22) Filed: Dec. 15, 2004

(65) Prior Publication Data

US 2006/0125157 A1 Jun. 15, 2006

(51) Int. Cl.
*B28B 3/00* (2006.01)

(52) U.S. Cl. ..................................... 264/618

(58) Field of Classification Search ............... 264/618; 201/103, 152
See application file for complete search history.

(56) References Cited

U.S. PATENT DOCUMENTS

| | | | |
|---|---|---|---|
| 3,300,344 A | 1/1967 | Bray et al. | |
| 3,503,809 A | 3/1970 | Spacil | |
| 3,558,360 A | 1/1971 | Sverdrup et al. | |
| 3,607,323 A | 9/1971 | Tedmon et al. | |
| 4,465,778 A | 8/1984 | Brook et al. | |
| 4,767,518 A | 8/1988 | Makalick | |
| 4,866,014 A * | 9/1989 | Cassidy et al. | 501/103 |
| 4,883,497 A | 11/1989 | Claar et al. | |
| 4,971,830 A | 11/1990 | Jensen | |
| 5,035,962 A | 7/1991 | Jensen | |
| 5,118,491 A * | 6/1992 | Castellano et al. | 423/608 |
| 5,217,822 A | 6/1993 | Yoshida et al. | |
| 5,227,258 A | 7/1993 | Ito et al. | |
| 5,261,944 A | 11/1993 | Lockhart et al. | |
| 5,368,667 A | 11/1994 | Minh et al. | |
| 5,474,800 A * | 12/1995 | Matsuzaki | 427/115 |
| 5,543,239 A | 8/1996 | Virkar et al. | |
| 5,589,017 A | 12/1996 | Minh | |

(Continued)

OTHER PUBLICATIONS

M. Marinšek, K. Zupan and J. Maček, Preparation of Ni-YSZ composite materials for solid oxide fuel cell anodes by the gel-precipitation method, J. Power Sources 86 (2000), pp. 383-389.*

(Continued)

*Primary Examiner*—Steven P Griffin
*Assistant Examiner*—Russell J Kemmerle, III
(74) *Attorney, Agent, or Firm*—Townsend and Townsend and Crew LLP

(57) ABSTRACT

A method of making a solid electrolyte-YSZ product, where the method includes the step of providing a powdered mixture of zirconia, yttria and a metal oxide, where yttria-stabilized zirconia is not added to the mixture. The method also includes sintering the powdered mixture at about 1500° C. or less, for about 5 hours or less, to form a two-phase composite that includes cubic YSZ and the metal oxide. Also, a method of making a fuel cell electrode that includes the step of forming a green body that includes zirconia, yttria and a metal oxide, where yttria-stabilized zirconia is not added to the green body. The method also includes shaping the green body into a form of the electrode, and sintering the green body at about 1500° C. or less to form a two-phased sintered body that includes cubic yttria-stabilized zirconia and the metal oxide. The method may further include reducing the sintered body to form the electrode.

18 Claims, 5 Drawing Sheets

U.S. PATENT DOCUMENTS

| | | | |
|---|---|---|---|
| 5,656,387 | A | 8/1997 | Barnett et al. |
| 5,788,788 | A | 8/1998 | Minh |
| 5,804,131 | A * | 9/1998 | Majumdar et al. .......... 264/621 |
| 5,908,713 | A | 6/1999 | Ruka et al. |
| 5,993,511 | A | 11/1999 | Piro et al. |
| 6,099,985 | A | 8/2000 | Elangovan et al. |
| 6,248,468 | B1 | 6/2001 | Ruka et al. |
| 6,312,847 | B1 | 11/2001 | Tsukuda et al. |
| 6,344,426 | B1 | 2/2002 | Hata et al. |
| 6,379,417 | B2 | 4/2002 | Piro et al. |
| 6,432,570 | B1 | 8/2002 | Ippommatsu et al. |
| 6,589,680 | B1 | 7/2003 | Gorte et al. |
| 6,692,855 | B1 | 2/2004 | Aizawa et al. |
| 6,790,474 | B1 * | 9/2004 | Hishinuma et al. .......... 427/115 |
| 7,045,231 | B2 * | 5/2006 | Coors .......................... 429/17 |
| 2003/0219637 | A1 * | 11/2003 | Coors .......................... 429/17 |
| 2003/0224240 | A1 * | 12/2003 | Yamashita et al. ............. 429/44 |

OTHER PUBLICATIONS

M. Marinšek, K. Zupan and J. Maček, Ni-YSZ cermet anodes prepared by citrate/nitrate combustion synthesis, J. Power Sources 106 (2002), pp. 178-188.*

Chen, S. & Shen, P. "Effect of NiO Dissolution on the Transformation of Plasma-sprayed Y-PSZ" Materials Science and Engineering, 1989, pp. 159-165, vol. A114.

Chen, Shueiyuan & Shen, Pouyan "Polymorphic Transformation of t' phase in Yttria Partially Stabilized Zirconia" Materials Science and Engineering, 1990, pp. 145-152, vol. A123.

Chen, Shueiyuan et al. "Growth kinetics of sintered Ni/O/ZrO2 (3 mol. % Y2O3) composites" Materials Science and Engineering, 1992, pp. 251-258, vol. A158.

Chen, Shueiyuan et al. "Stability of Cubic ZrO2 (10 mol. % Y2O3) When Alloyed with NiO, Al2O3 or TiO2: Implications to Solid Electrolytes and Cermets", Materials Science and Engineering, 1994, pp. 247-255, vol. B22.

Kuzjukevics, A. et al. "Plasma Produced Ultrafine YSZ-NiO Powders" Proceedings of the 17th Risø International Symposium on Materials Science: *High Temperature Electrochemistry: Ceramics and Metals*, Eds. Poulsen et al., 1996, pp. 319-324.

Linderoth, Søren et al. "NiO in Yttria-doped Zirconia" Electrochemical Proceedings vol. 97-18, 1997, pp. 1076-1085.

Primdahl, Søren et al. "Effect of Nickel Oxide/Yttria-Stabilized Zirconia Anode Precursor Sintering Temperature on the Properties of Solid Oxide Fuel Cells" J. Am. Ceram. Soc., 2000, pp. 489-494, vol. 83, No. 3.

Ringuedé, A. et al. "A combustion synthesis method to obtain alternative cermet materials for SOFC anodes" Solid State Ionics 141-142, 2001, pp. 549-557.

Anselmi-Tamburini, U. et al., "Electrical Properties Of Ni/YSZ Cermets Obtained Through Combustion Synthesis," Solid State Ionics, vol. 110, pp. 35-43, 1998.

* cited by examiner

PREPARATION OF YTTRIA-STABILIZED ZIRCONIA REACTION SINTERED PRODUCTS

BACKGROUND OF THE INVENTION

This invention relates to the preparation of materials that may be used in the electrodes of solid electrolyte fuel cells. In particular, the invention relates to methods of making zirconia-containing fuel cell electrodes that are not prepared from expensive pre-cursor yttria-stabilized-zirconia (YSZ) starting materials.

Solid electrolyte fuel cells include both oxygen-ion conducting solid-oxide fuel cells (SOFCs), and protonic ceramic fuel cells (PCFCs). Each fuel cell includes a pair of electrodes separated by a ceramic electrolyte that permits ions (e.g., oxygen ions, protons, etc.) to migrate between the electrodes as the cell generates electrical current. In solid electrolyte fuel cells, the layer of electrolyte material is often kept thin (e.g., about 25 μm or less) to allow efficient ion migration between the electrodes. Such a thin electrolyte layer made from ion-conducting ceramics is usually too fragile to support itself, and therefore requires an underlying support layer.

In some fuel cell designs, one of the electrodes acts as an electrolyte support in addition to being an electrode. For example, the fuel cell anode may be a self-supporting anode electrode on which the thin electrolyte layer is formed. Not surprisingly, electrodes that act as a support layers use significantly more starting material than non-supporting electrodes.

In the case of anode supported SOFCs, the cells operate at temperatures of about 700° C. to about 1000° C., requiring that the thermal coefficient of expansion (TCE) be closely matched between the electrolyte and the anode to prevent the thin electrolyte layer from fracturing as well as to maintain good adhesion between the layers. One way to match the TCEs is to make a substantial portion the electrolyte and anode out of the same material. A material that has been used successfully in both the electrolyte and self supporting anode of solid electrolyte fuel cells is yttria-stabilized zirconia (YSZ). In the electrolyte, YSZ acts as a good oxygen ion conductor at fuel cell operating temperatures, and in the electrodes YSZ provides a good substrate support for conductive materials that conduct the electrical current. For example, the anode may be made from a mixture of nickel oxide (NiO) homogenously dispersed in YSZ. When the nickel oxide is reduced to nickel metal the material becomes an electrically conductive ceramic-metal composite or "cermet." The finely dispersed YSZ in the anode also provides the three phase boundary (TPB) between the gas, electrode, and electrolyte.

Unfortunately, conventional methods for making YSZ for solid electrolyte fuel cells are complex and expensive. In one method, powders of monoclinic zirconia ($ZrO_2$) and 8-mol % yttria ($Y_2O_3$) are mixed and calcined at high temperature (e.g., about 1700° C.) to form tetragonal and cubic phased zirconia. As the reaction continues, fully yttria-stabilized cubic phased zirconia (i.e., YSZ) results. The reaction is slow, and the conversion of the zirconia into YSZ yttria requires the mixture be kept at high temperature for an extended period of time. As a result, the YSZ is formed as a large grained powder (e.g., grains greater than 1 μm in diameter), which may have to be extensively milled before it can be used in fuel cell electrolytes and electrodes. Other conventional methods of making YSZ, such as spray pyrolysis and co-precipitation, are even more complicated and costly.

The high cost of YSZ produced by conventional methods is an impediment to the widespread adoption of solid electrolyte fuel cells for residential and industrial power needs. This impediment is especially acute for fuel cells with a self-supporting electrode that can make up 90% or more of the total material used in the cell. Thus, the development of less complicated and costly methods of making YSZ for fuel cell electrodes would provide a significant advance in making fuel cells less expensive and more competitive for the generation of electric power.

BRIEF SUMMARY OF THE INVENTION

Embodiments of the invention include methods of making a solid electrolyte-YSZ product from a solid-state reaction. The methods include the steps of providing a powdered mixture of zirconia, yttria and a metal oxide, without having to add yttria-stabilized zirconia; and sintering the powdered mixture in situ at about 1500° C. or less for about 5 hours or less, to form a two-phase mixture that includes cubic YSZ and the metal oxide.

Embodiments further include methods of making a fuel cell electrode. The methods include the step of forming an unfired, or "green" body that includes zirconia, yttria and a metal oxide, where substantially no yttria-stabilized zirconia is added to the green body. The method also includes shaping the green body into a form of the electrode, and sintering the green body at about 1500° C. or less to form a sintered body that includes cubic yttria-stabilized zirconia and the metal oxide. The method may also include reducing the sintered body to form the electrode.

Embodiments also include methods of making solid electrolyte fuel cells. The methods include the steps of forming a self-supporting electrode from a YSZ cermet, forming an electrolyte on the self supporting electrode, and forming a second electrode on the electrolyte. The YSZ cermet may be made by combining zirconia, yttria, and a metal oxide into a powdered mixture, where yttria-stabilized zirconia is not needed. Then, the mixture may be sintered at about 1500° C. or less for about 5 hours or less to form a reacted two-phase body that includes cubic yttria-stabilized zirconia and the metal oxide. The two-phase body may be reduced to form the self-supporting electrode.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

In the present invention, it has been discovered that yttria-stabilized zirconia may be made by the reaction sintering of yttria powder and monoclinic zirconia in the presence of a metal oxide (e.g., nickel oxide) at low temperatures. These inexpensive starting materials may be converted in-situ into substantially pure-phased cubic YSZ plus metal oxide instead of having to use expensive YSZ as a starting material. The metal oxide in the sintered product may be reduced to an electrically conductive cermet that can be used in a fuel cell electrode, among other devices. Additional details on making a cermet according to the invention will now be described.

Exemplary Methods of Making The Cermet

Figure 1:
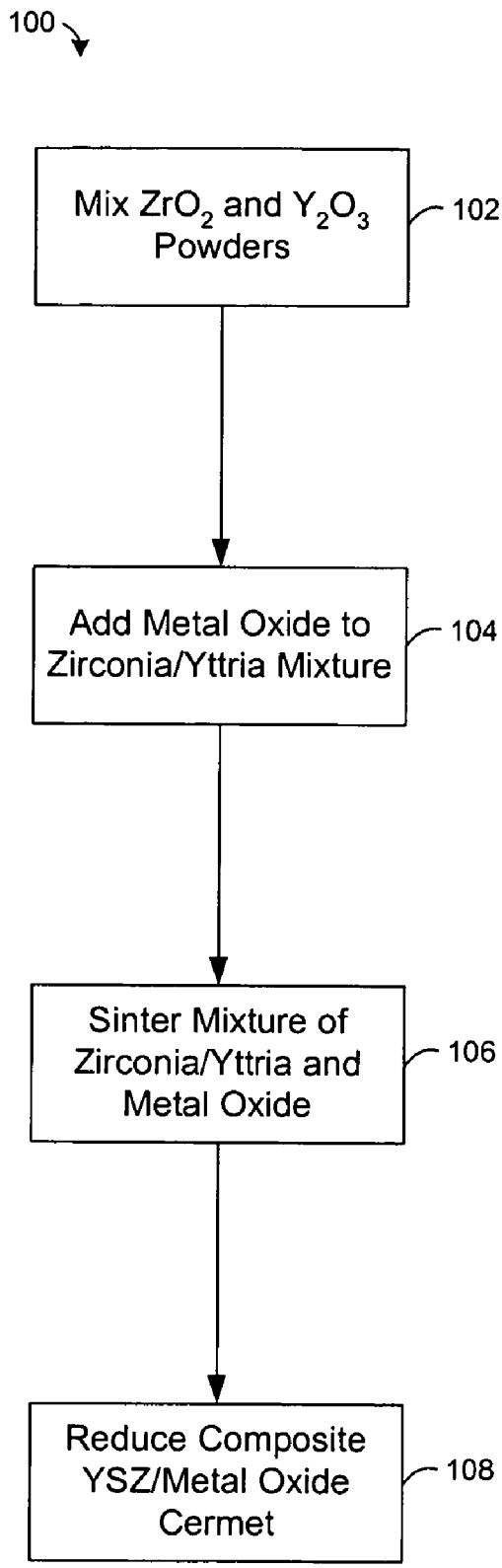
FIG. 1 is a flowchart diagramming some of the steps in an embodiment of the method of the invention.

FIG. 1 shows a flowchart describing steps from a method 100 of making reaction sintered YSZ according to an embodiment of the invention. In step 102, yttria ($Y_2O_3$) and zirconia ($ZrO_2$) powders may be mixed together to form a yttria-zirconia mixture. The amount of yttria in the mixture (i.e., mol percent $Y_2O_3$) may be selected so the yttria stabilizes the zirconia in the suitable phase. For example, when about 1 to 3-mol % yttria is present in the heated mixture, the zirconia may be stabilized in tetragonal and/or cubic phases when the mixture is cooled back down to room temperature. With the addition of about 3-mol % to about 10-mol % yttria in the mixture, stabilized zirconia may be formed, called YSZ (e.g., 3YSZ to 10YSZ), which is mechanically stable and ionically conducting over a wide temperature range. Solid electrolyte fuel cells often use 8-mol % yttria-stabilized zirconia (i.e., 8YSZ) in fuel cell electrodes and electrolytes, due to the good mechanical properties and high ionic conductivity.

In step 104, a metal oxide is added to the mixture prepared in step 102 to facilitate the reactivity of the yttria and zirconia at a temperature of about 1500° C. or less. The metal oxide may be nickel oxide, iron oxide, cobalt oxide, manganese oxide, copper oxide, as well as combinations of these and other metal oxides. When the mixture is being prepared as a cermet electrode for a solid electrolyte fuel cell, nickel oxide may be chosen as the facilitator due to the high electronic conductivity, catalytic activity and stability of nickel metal under chemically reducing conditions. Other metal oxides may be selected for similar reasons.

In step 106, the mixture of yttria, zirconia and metal oxide may be heated to about 1500° C. or less in air, for about 5 hours or less. At these short times and low temperatures, a mixture of pure yttria and zirconia would not sufficiently react to form the equilibrium cubic YSZ, but in the presence of the metal oxide, there is enhanced reactivity allowing cubic YSZ to readily form. This in situ calcinations process is called reaction sintering, where a solid state reaction and ceramic sintering occur simultaneously.

The metal oxide enhances the rate at which the equilibrium cubic phase of YSZ is produced. Without the metal oxide, the reaction between yttria and zirconia is too slow at 1500° C. to be practical. In step 108, the reaction sintered product may be exposed to a reducing environment to reduce at least a portion of the metal oxide to produce the base metal. If the metal oxide is nickel oxide, at least some of the metal oxide may be reduced to the pure metal (nickel metal) in the reducing step 108. A hydrogen-containing atmosphere is usually used to reduce the anode. This can be done inside the fuel cell, or as a separate step (a typical separate reducing profile is 800° C. for 24 hours). Reducing at least a portion of the metal oxide to the conductive metal coverts the sintered product into an electrically conductive cermet suitable for solid electrolyte fuel cell electrodes (e.g., fuel cell anodes).

Figure 2A:
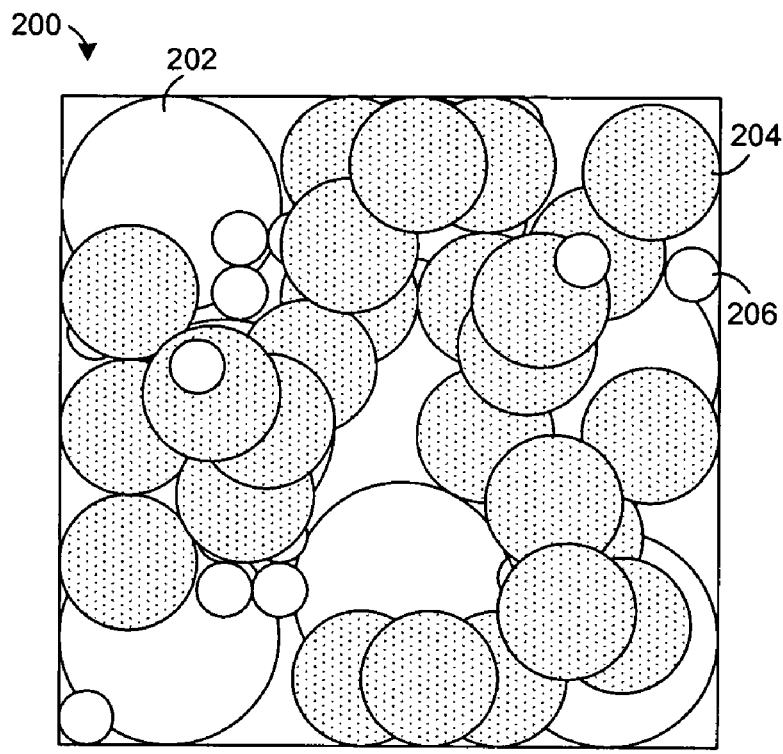
FIGS. 2A-B show cross-sectional distributions of particles before and after a reduction of the nickel oxide to nickel metal.
Figure 2B:
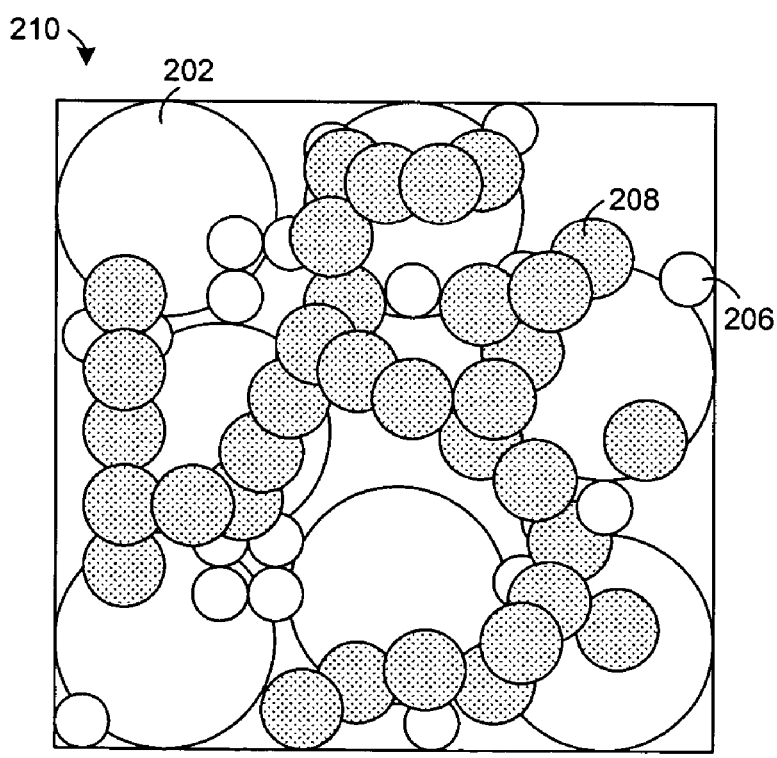

FIGS. 2A and 2B show a cross-section of a sintered mixture of yttria, zirconia and nickel oxide before and after a reduction step like step 108 described above. FIG. 2A shows a cross-sectional matrix of a pre-reduced mixture 200, which includes particles of coarse YSZ 202 and fine YSZ 206 in contact with particles of nickel oxide 204. FIG. 2B shows a cross-sectional matrix of a reduced mixture 210 that shows the particles of nickel oxide 204 having been reduced to particles of nickel metal 208.

YSZ cermets like the one shown in FIG. 2B have good fuel cell electrode characteristics, including high porosity (e.g., about 20% to about 40%), good mechanical strength, good catalytic activity, and good electronic conductivity as a result of the interconnected metallic grains. These characteristics can also make the cermets useful as materials for gaseous diffusion membranes and gas sensors.

Exemplary Solid Electrolyte Fuel Cell

Figure 3:
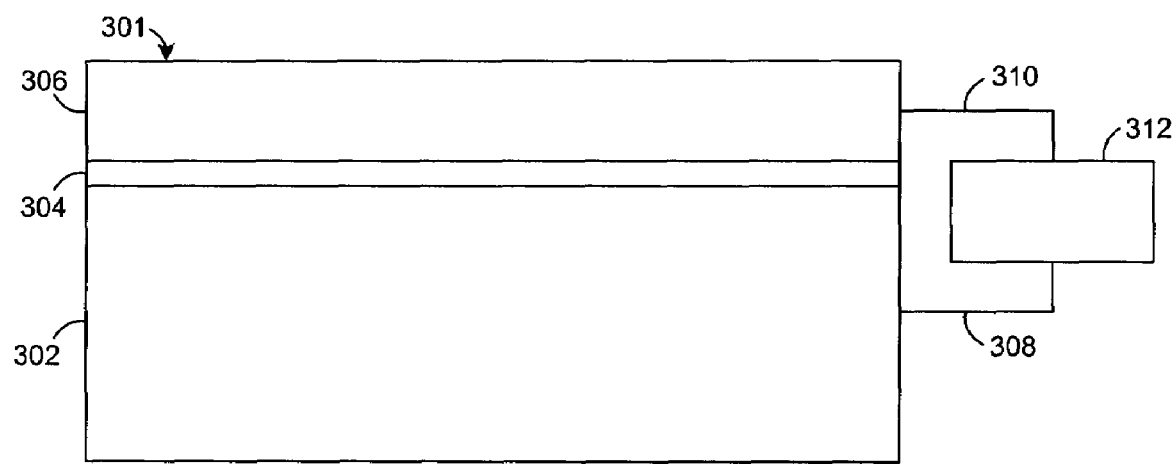
FIG. 3 shows a cross-section of a solid electrolyte fuel cell having a cermet support electrode.

FIG. 3 shows a simplified schematic of a solid electrolyte fuel cell 301 that includes materials made according to the present invention. The fuel cell includes a solid electrolyte 304 contacting both cathode electrode 306 and anode electrode 302. The fuel cell may be a SOFC, where the electrode material may be a solid oxide ceramic that conducts oxygen ions ($O^{2-}$), or a PCFC, where the electrode may be made from a proton conducting ceramic that conducts protons ($H^+$). Ion conducting materials, including mixed ionic conductors, used in electrolyte 304 may include yttria-stabilized zirconia (e.g., 8YSZ), scandia doped zirconia (e.g., SDZ), doped ceria, and perovskite ceramic proton conductors (e.g., yttrium-doped barium cerate), among other materials.

The anode electrode 302 may be a self-supporting electrode, formed from a YSZ cermet made according to methods of the invention. In some embodiments, a mixture of yttria, zirconia and metal oxide may be formed into a green body that has the shape of the electrode 302. The green body may then be reaction sintered at about 1500° C. or less to form a sintered body made primarily of YSZ and the metal oxide. The sintered body may be exposed to a reducing environment to reduce the body to the electrode 302. For example, if the metal oxide is nickel oxide, the reducing environment converts at least a portion of the NiO to nickel metal, making the electrode 302 more electrically conductive. In other embodiments, the yttria, zirconia and metal oxide may be converted into an unreduced composite before being shaped into electrode 302.

The electrolyte 304 materials may be formed on the anode electrode 302 by any conventional means such as spraying, dip-coating, painting etc. The electrolyte 304 may be applied to the anode electrode prior to reaction sintering, in which case the electrolyte and electrode are co-sintered. That is, the electrode simultaneously undergoes reaction sintering while the electrolyte undergoes ordinary sintering. The electrolyte may also be applied to the electrode subsequent to reaction sintering of the electrode in a process that may include additional sintering operations.

The electrolyte 304 may be formed with a thickness of about 25 µm or less to facilitate the fast migration of ions between the electrodes 302 and 306. The cathode electrode 306 may also be made from a conductive ceramic or other conventional SOFC or PCFC cathode electrode materials. The electrodes 302 and 306 may be connected via electrically conductive conduits 308 and 310 to supply electrical energy to load 312 to produce useful work. The anode support of the assembled solid electrolyte fuel cell (e.g., the assembled cathode, electrolyte, and anode) may be reduced in the fuel cell itself in, for example, a hydrogen containing atmosphere, or separately in a hydrogen-containing atmosphere. A typical profile used to reduce the cermets would be a 4% hydrogen atmosphere, with the balance being argon, at temperature of 800° C., for about 24 hours.

EXAMPLES

Figure 4:
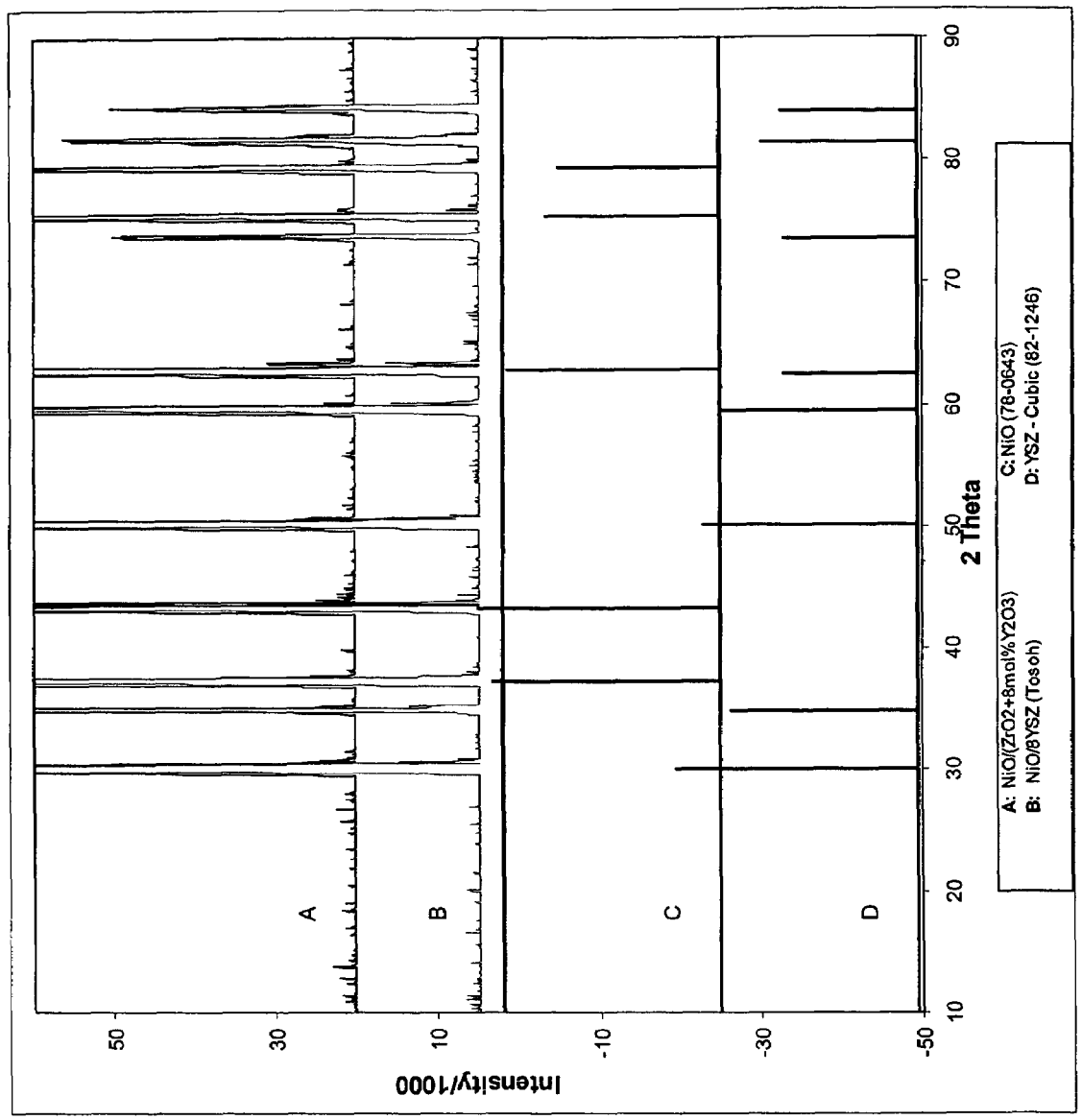
FIG. 4 is an X-ray diffraction pattern of a sintered zirconia-yttria and nickel oxide mixture compared with commercially made 8YSZ.

Experiments were conducted to examine the effect of nickel oxide (NiO) on the heating of powdered zirconia ($ZrO_2$) and yttria ($Y_2O_3$). A mixture of zirconia and 8-mol % yttria were mixed with nickel oxide and heated at about 1500° C. in air for less than 5 hours. Typically, the NiO comprises about half (by weight) of the composite, with the balance consisting of $ZrO_2$ and $Y_2O_3$. The NiO enhances the rate at which zirconia and yttria react, allowing a two phase composite of YSZ and NiO to be formed at about 1500° C. FIG. 4 shows an X-ray diffraction pattern of the sintered product, which reveals a strong correlation of the peaks with commercially made 8-mol % yttria stabilized zirconia from Tosoh. The XRD pattern also lacks peaks attributable to the yttria or monoclinic zirconia starting materials. This indicates that virtually all of the powdered zirconia and yttria were converted to cubic 8YSZ during sintering in the presence of NiO.

Figure 5:
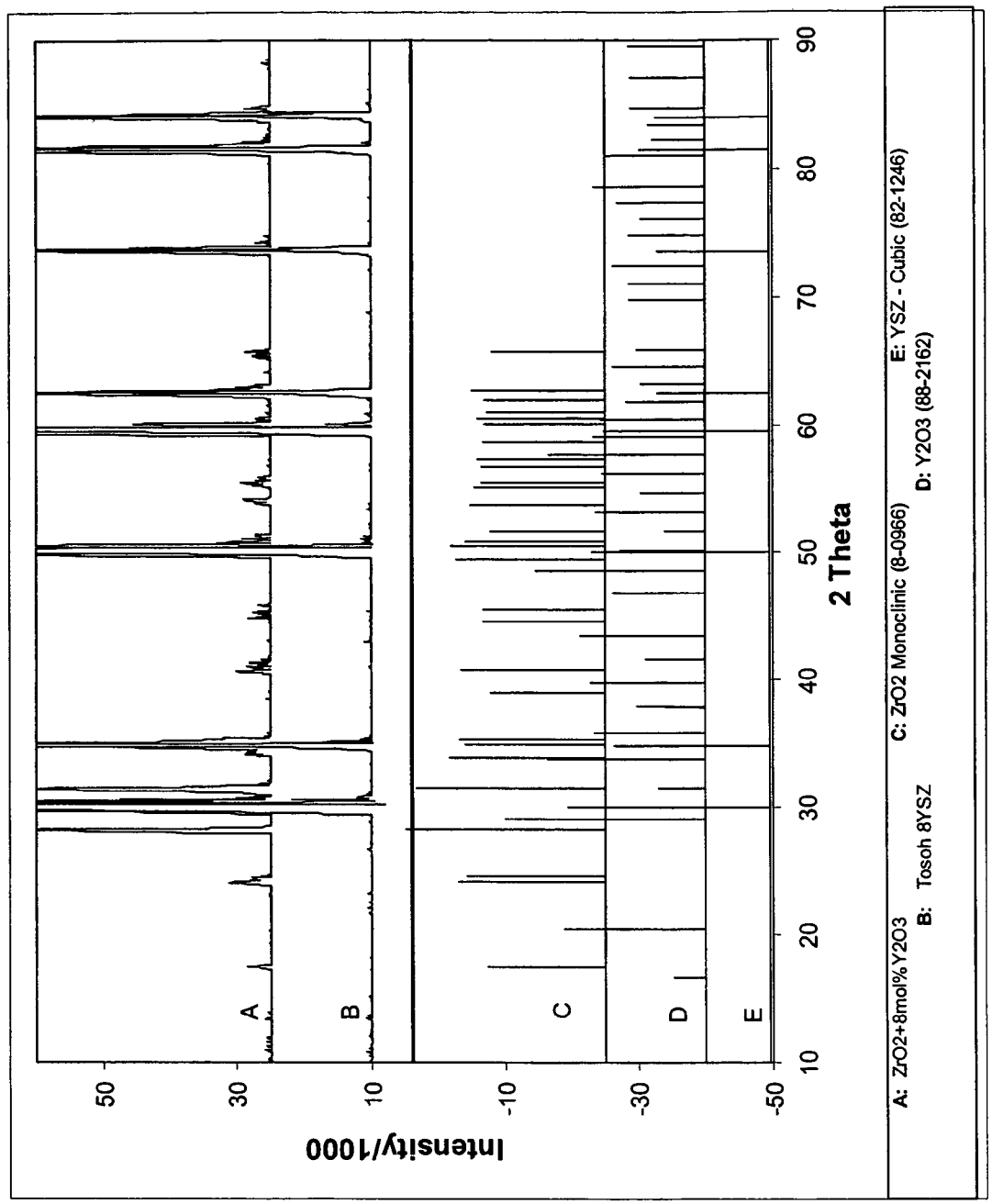
FIG. 5. is an X-ray diffraction pattern of a calcined zirconia-yttria mixture compared with commercially made 8YSZ.

A comparative experiment was also conducted where powders of zirconia and 8-mol % yttria were mixed and fired without nickel oxide. Heating the powdered mixture at about 1500° C. for less than 5 hours, without the NiO, resulted in a poly-phase material with some cubic 8YSZ, as well as unreacted monoclinic zirconia, unreacted yttria, and other yttria/zirconia compounds. FIG. 5 shows an X-ray diffraction pattern of the calcined product, which has peaks correlating to a combination cubic 8YSZ, as well as the other phases mentioned. Thus, calcinating yttria and zirconia for only a few hours at this temperature does not allow for the conversion to pure cubic YSZ. The nickel oxide enhanced the solid-state reaction between yttria and zirconia, readily producing cubic YSZ (i.e., reaction sintering).

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

As used herein and in the appended claims, the singular forms "a", "and", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, or groups.

What is claimed is:

1. A method of making a solid electrolyte-YSZ product, the method comprising:
   providing separate powders of zirconia, yttria, and a metal oxide and mixing them into a powdered mixture of zirconia, yttria and the metal oxide, wherein yttria-stabilized zirconia is not added to the mixture;
   sintering the powdered mixture at about 1500° C. or less, for about 5 hours or less, to form a two-phase composite comprising cubic YSZ and the metal oxide.

2. The method of claim 1, wherein at least a portion of the metal oxide is reduced to a metal.

3. The method of claim 2, wherein the metal oxide is reduced to the metal in an atmosphere comprising hydrogen.

4. The method of claim 1, wherein the metal oxide is nickel oxide.

5. The method of claim 1, wherein the product is a cermet that is used in an electrode of a solid oxide fuel cell.

6. The method of claim 1, wherein the powdered mixture comprises about 3-mol % to about 10-mol % yttria.

7. The method of claim 1, wherein the powdered mixture comprises about 8-mol % yttria.

8. The method of claim 1, wherein the metal oxide is selected from the group consisting of nickel oxide, iron oxide, cobalt oxide, manganese oxide, copper oxide, and mixtures thereof.

9. A method of making a fuel cell electrode, the method comprising:
   forming a green body from separate powders of zirconia, yttria, and a metal oxide that have been mixed together into a powdered mixture comprising zirconia, yttria and the metal oxide, wherein yttria-stabilized zirconia is not added to the green body;
   shaping the green body into a form of the electrode;
   sintering the green body at about 1500° C. or less to form a two-phased sintered body comprising cubic yttria-stabilized zirconia and the metal oxide; and
   reducing the sintered body to form the electrode.

10. The method of claim 9, wherein the metal oxide is nickel oxide.

11. The method of claim 10, wherein the reducing of the sintered body reduces at least a portion of the nickel oxide to nickel metal.

12. The method of claim 9, wherein the green body is sintered for about 5 hours or less.

13. A method of making a ceramic oxide fuel cell, the method comprising:
   forming a self-supporting electrode from a YSZ cermet;
   forming an electrolyte on the self supporting electrode; and
   forming a second electrode on the electrolyte,
   wherein the self-supporting electrode is made by:
   combining separate powders of zirconia, yttria, and a metal oxide into a powdered mixture of zirconia, yttria and the metal oxide, wherein yttria-stabilized zirconia is not needed; and
   sintering the mixture at about 1500° C. or less, for about 5 hours or less, to form a reacted two-phase body comprising cubic yttria-stabilized zirconia and the metal oxide; and
   reducing the sintered body to form the self-supporting electrode.

14. The method of claim 13, wherein the ceramic oxide fuel cell is a solid oxide fuel cell.

15. The method of claim 13, wherein the ceramic oxide fuel cell is a protonic ceramic fuel cell.

16. The method of claim 13, wherein the metal oxide comprises nickel oxide.

17. The method of claim 13, wherein the electrolyte comprises YSZ.

18. A method of making a solid electrolyte-YSZ product, the method comprising:

providing separate powders of zirconia, yttria, and a metal oxide and combing them into a powdered mixture of zirconia, yttria and the metal oxide, wherein yttria-stabilized zirconia is not added to the mixture;

sintering the powdered mixture at about 1500° C. or less, for about 5 hours or less, to form a two-phase composite consisting essentially of YSZ and the metal oxide.

* * * * *